Patented Dec. 26, 1922.

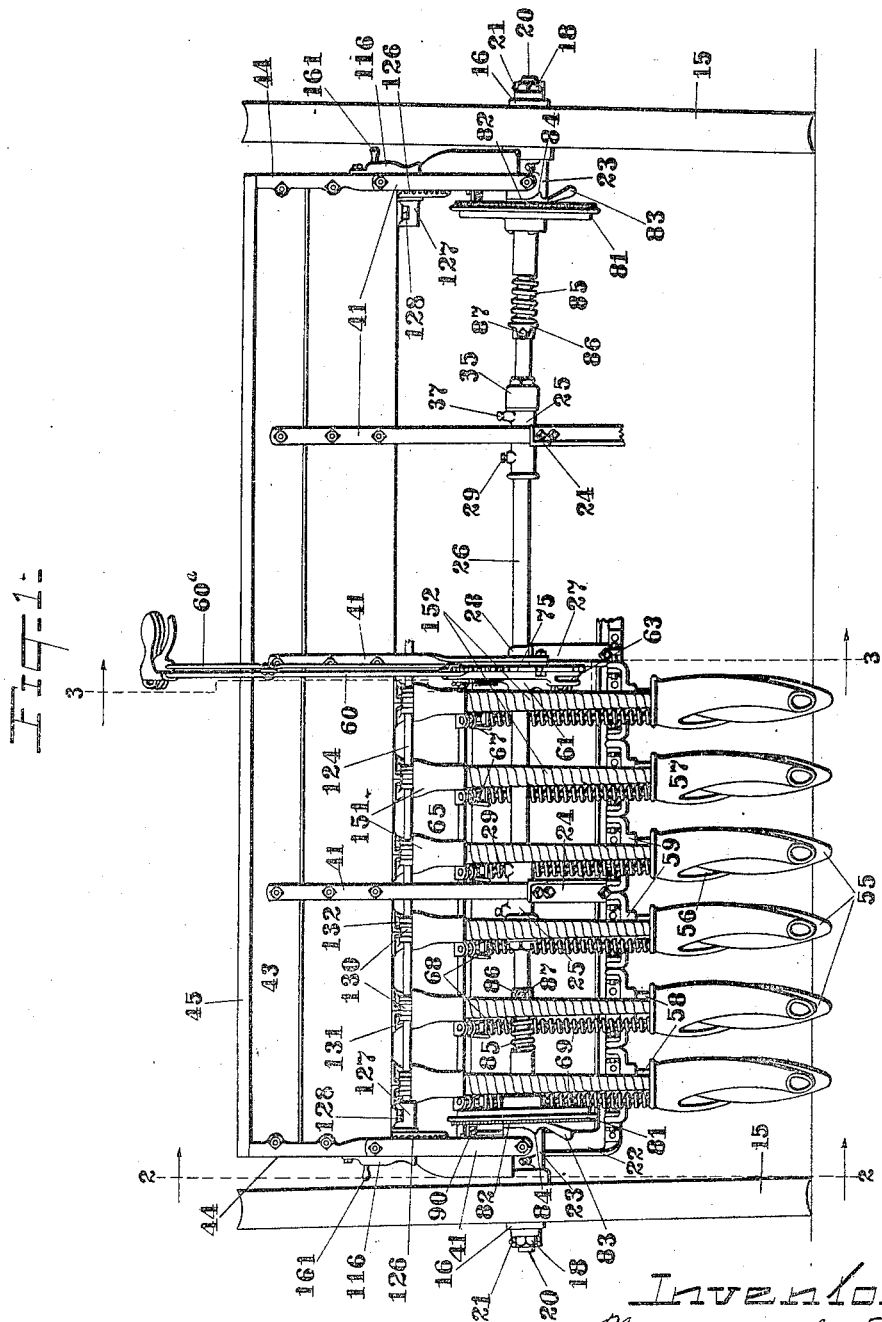

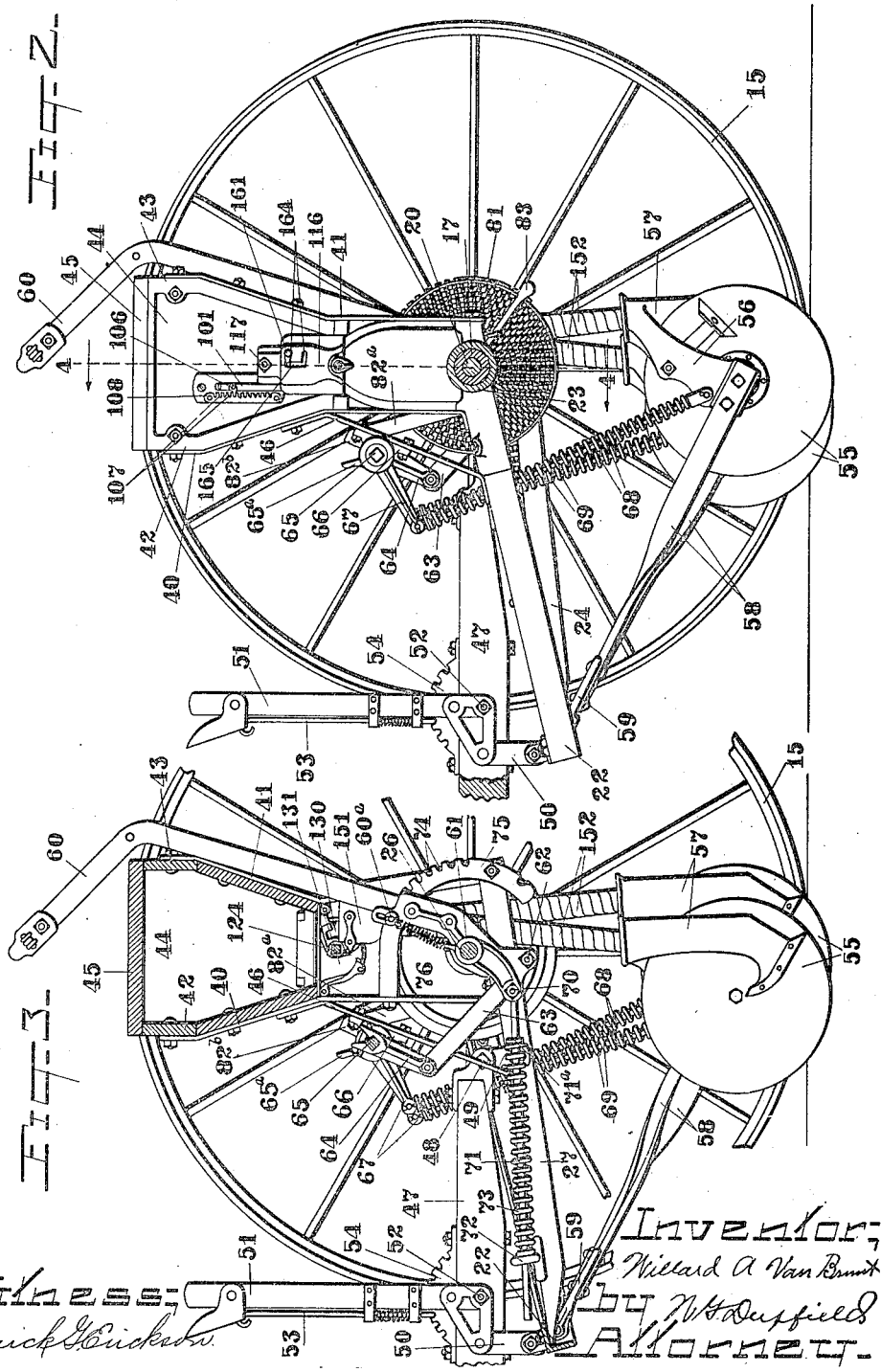

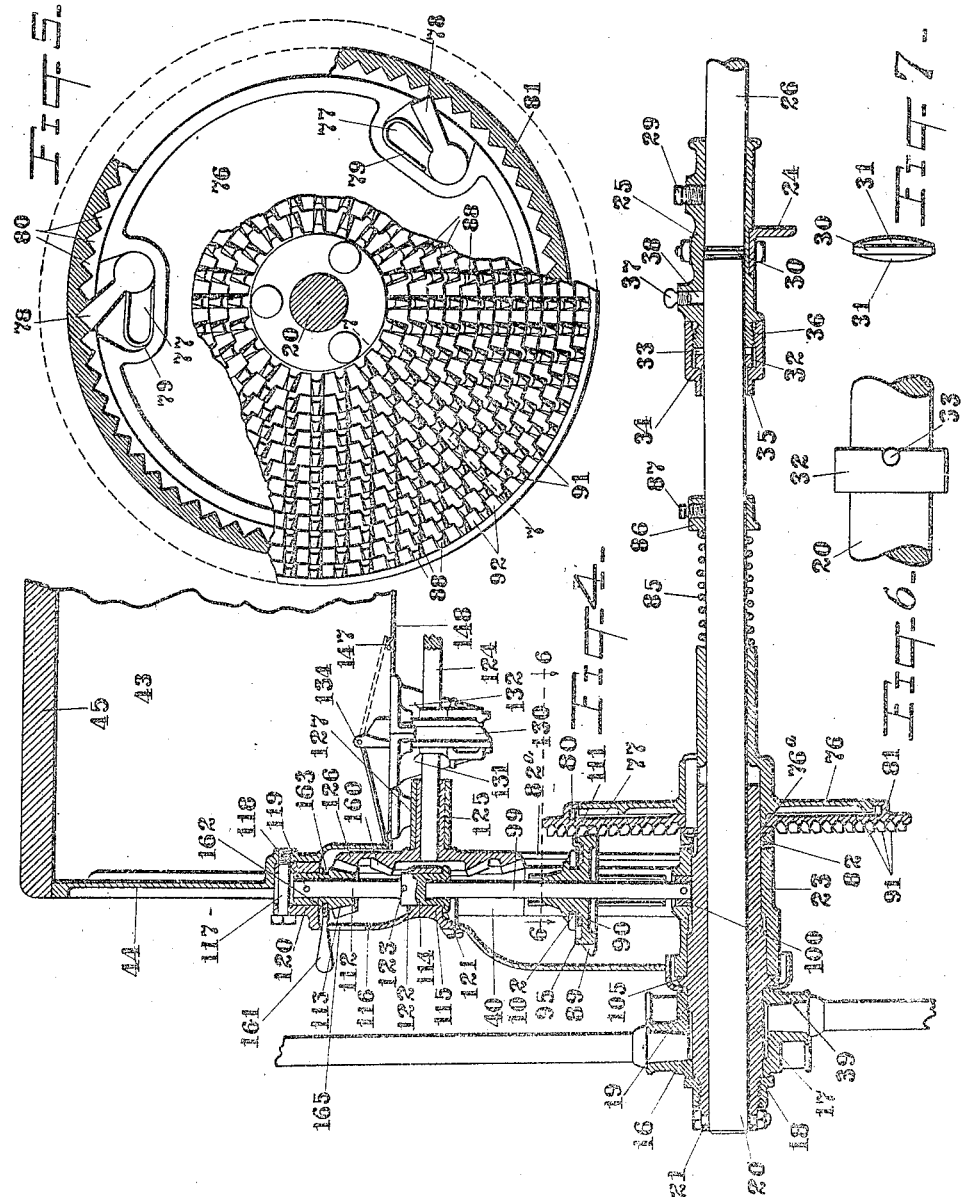

1,439,928

UNITED STATES PATENT OFFICE.

WILLARD A. VAN BRUNT, OF HORICON, WISCONSIN, ASSIGNOR TO VAN BRUNT MANUFACTURING COMPANY, OF HORICON, WISCONSIN, A CORPORATION OF WISCONSIN.

SEEDING MACHINE.

Application filed June 10, 1918. Serial No. 239,109.

*To all whom it may concern:*

Be it known that I, WILLARD A. VAN BRUNT, a citizen of the United States, residing at Horicon, in the county of Dodge and State of Wisconsin, have invented certain new and useful Improvements in Seeding Machines, of which the following is a specification, reference being had therein to the accompanying drawing.

This invention relates to improvements in seeding machines and particularly to that class of structures wherein the devices for feeding the seed from a hopper to the furrow openers are operated by power furnished from the supporting wheels.

The principal object of the invention is to improve the frame and axle construction and provide for more efficiently supporting the weight of the machine and the mass of seed carried in the hopper. The construction illustrated and hereinafter described is also an improvement from the standpoint of simplifying the manufacturer's problem of furnishing a seeder in a variety of sizes to meet the needs in different localities, for the outer sections, which carry the power transmitting and speed variable means, are built as standardized units and can be used in the assembly of a machine regardless of the width of its other parts.

Another object of the invention is to improve devices of this type in sundry details hereinafter pointed out.

The preferred means by which I accomplish my objects are illustrated in the accompanying drawings and are hereinafter specifically described.

In the drawings,

Figure 1 is a rear elevation of my improved seeder, a number of the seed furrow openers being omitted at one side to better show the axle construction.

Figure 2 is a vertical section on line 2—2 of Figure 1.

Figure 3 is a vertical section on line 3—3 of Figure 1.

Figure 4 is a transverse vertical section on line 4—4 of Figure 2, showing the speed varying and power transmitting means at one side of the machine.

Figure 5 is a face view of the toothed speed variable disk, a portion of the disk being broken away to show the ratchet clutch arrangement, and Figures 6 and 7 are enlarged details.

Referring to the drawings in which like numerals indicate identical parts, 15 indicates the supporting wheels, which, as shown in Figure 4, are of the staggered spoke type. The hub 16 of each wheel is mounted upon a drive sleeve 17 and held in place by a threaded washer 18. The sleeve 17 is caused to turn with the wheel by interengaging means such as a lug formed on the sleeve and fitting a recess in the wheel hub, as indicated at 19, Figure 4.

Each drive sleeve 17 is mounted on a live axle 20 and is secured thereto by bolt 21 so the wheel, sleeve and live axle all turn together.

22 is a forwardly extending, substantially horizontally positioned, angle iron frame member, bent into the general form of a U, with its intermediate portion to the front, the rear end portions of the side sections being secured to boxings 23 journaled upon the sleeves 17. Extending rearwardly from the transverse or intermediate part of the U shaped frame member 22 are frame members 24 that are secured at their rear ends to boxings 25 mounted on the ends of the centrally located dead axle or frame member 26, the boxings 25 also receiving and forming bearings for the inner ends of the live axles 20. A frame member 27 connects the center portion of the transverse part of frame member 22 with a support 28 secured to the center portion of the dead axle 26. The dead axle is firmly held from rotating or endwise shifting in the boxings 25 by set bolts 29. The portion of each boxing 25 that receives the end of the live axle, is inclined slightly downward toward the outside, and the bearing formed in each boxing 23 for the sleeves 17 is inclined in the same plane, the purpose being to gather the wheels inwardly at the bottom, the better to withstand the strains of the load and prevent the middle portion of the machine sagging. Many of the seeders that go into the fields are equipped with dished wheels, and this axle construction also provides in such cases for the wheels being so positioned that the spokes sustaining the weight stand perpendicular.

By the construction described the members 22, 24, 26 and 27, together with the boxings 23 and 25, constitute a light, rigid and strong frame which efficiently supports the live axles 20 in the desired inclined position, and cooperates with them to sustain the weight imposed upon them. At the same time, by this construction the live axles with the parts carried thereby may be standardized to go with machines of a variety of widths.

The live axle sections are prevented from shifting endwise in the following manner: A thrust washer 30 having convex bearing faces 31 is inserted in each boxing 25 between the end of the live axle and the end of the dead axle, inward pressure of the live axle being transmitted through this washer to the dead axle which is firmly held in its supports by the set bolts 29. The outward end thrust of either live axle is transmitted to its boxing 25 by a collar 32 which is caused to turn with the live axle by a pin 33 passing through the axle, the outer face of the collar 32 bearing against an internal face 34 of a cap washer 35 adjustably secured to the outer portion of the boxing as indicated at 36. 37 is a screw plug for closing a cavity 38 communicating with the axle bearing for conveying lubricant thereto.

A flange 39 formed on the sleeve 17, serves as an abutment with which the boxing 23 contacts to resist outward thrust of said boxing, such strain being carried back to the center dead axle or frame member 26, by reason of the sleeve 17 being keyed to the live axle which in turn is held from outward displacement by the collar 33 and cap 34.

Front and rear frame standards 40 and 41 respectively, secured at their lower ends to the rearward portion of the frame members 22—24 and 27, and the boxings 23, 25 and the center support 28, extend upwardly and support the seed hopper formed of a front wall 42, a rear wall 43, ends 44 and a hinged lid 45. 46 are braces connecting the standards 40 and seed hopper with the forwardly extending frame members 22—24 and 27, the whole comprising a strong substantial machine frame.

A tongue 47 is pivoted at 48 to a bracket 49 supported by the center frame member 27 and the members 24. The transverse portion of the forwardly extending frame member 22 is connected with the tongue by a link 50 and a lever 51 pivoted at 52 upon the tongue and having the usual latching device 53 that co-operates with a notched sector 54. By adjusting lever 51 the frame can be set to level the seeding devices relative to the tongue, the angle of the tongue and its height from the ground at the front end being governed largely by the size of the draft animals.

The seed furrow openers illustrated in the drawings are of the disc type, although any form of furrow openers may be used as desired. In this instance the disc 55 of each furrow opener unit is journaled upon an arm 56 of the seed boot 57. Connected with the arm 56 and extending forwardly and upwardly is a drag bar 58 which at its forward end is pivotally attached to the transverse section of the frame member 22 by a yoke 59. The elevation of or working position of the furrow openers is controlled by a lever 60 which has a bearing 61 mounted on the dead axle 26. To the lower end of the lever at 62 a link 63 is pivoted, its other end being pivotally connected to an arm 64 clamped to a square rock shaft 65, extending across the front of the machine, and supported in bearings 66 attached to the braces 46. Clamped to the rock shaft 65, at spaces throughout its length, are forwardly projecting arms 67 to which are pivoted jointed rods 68 that in turn are pivoted at their lower ends to the boot arms 56. Springs 69 are mounted on the rods 68, so the furrow openers can be put into the soil under yielding pressure and to permit one furrow opener to yield independently of another. Pivoted at 70 to the lower end of the lever 60 is a spring actuated plunger rod 71 slidably supported at its forward end in an eye 72 secured to the frame member 27. 73 is a heavy compression spring mounted on the rod intermediate the eye 72 and a pin 71ᵃ through the rod. When the lever 60 is moved until the point 70 intersects the planes extending through the axle 26 and eye 72 the spring is under greatest compression, and movement of the lever in either direction from this position will be assisted by the power stored in the spring. The furrow openers may be locked in any one of several positions by means of the hand operated latching device 60ᵃ mounted on the lever 60 that engages with notches 74 formed in sector 75.

In the machine illustrated the seed feeding devices are operated by means of driving plates 76, one of which is mounted upon each sleeve 17 and axle 20 so as to turn therewith and to be capable of movement longitudinally thereof. Near the periphery of these driving plates in suitable pockets 77, are mounted ratchet dogs 78 which are pressed outwardly by springs 79. The dogs 78 engage with ratchet teeth 80 formed on a drive disk 81, and the dogs are so positioned that as the wheel 15 and sleeve 17 turn forwardly one of the dogs engages a tooth 80 and carries the disk 81 forward, but if the wheel and sleeve turn rearward, as when the machine is backed, the dogs snap over the ratchet teeth 80 permitting the disk to remain stationary, the hub of the plate 76 rotating in the bearing of the disk upon the plate indicated at 76ᵃ. I employ three sets of dogs for each plate and they are so spaced circumferentially that only one dog at a time can abut squarely against a tooth 80, the other two dogs being out of abutting engagement with the faces of the ratchet teeth, one slightly more than the other. The purpose of this arrangement is to make the clutch sensitive or quick to respond to forward movement, it being desirable to apply power to the seed feeding devices promptly upon the first forward movement of the machine, and it likewise being undesirable to have the seed feeding devices operate upon backing the machine as when turning sometimes at the ends of fields. The driving plate and disk as an entirety may be shifted inwardly on the sleeve 17, to disconnect the application of power to the seed feeding devices, by means of a ring 82 mounted on the sleeve 17 between the hub of plate 76 and the boxing 23, the ring having a hand hold 83 (see Figs. 1 and 2) by which it can be turned upwardly on the sleeve thus bringing a cam 84, formed on the ring, into gliding contact with a suitable surface on the boxing thereby shifting the ring, plate and disk against the tension of spring 85, mounted on the axle between the hub of plate 76, and a collar 86, fastened to the axle by set bolt 87. When the hand hold is turned in the opposite direction the spring presses the plate and disk in driving contact with its co-operating part.

When the furrow openers are raised with the lever 60, arms 65$^a$ secured to the rock shaft 65, near its ends, contact with the ends of bars 82$^a$, the upper ends of which are pivotally connected with the rock shaft 65 by links 82$^b$ journaled on the rock shaft, and the lower ends of which are pivotally attached to the forward side of the ring 82, and move the bars downwardly which turn the rings and shift the drive plates and disks inwardly far enough to break the drive connection to the seed feeding devices so they will be inactive. When the furrow openers are lowered the arms 65$^a$ rock away from the bars 82$^a$ whereupon the weight of the hand holds 83 turns the rings 82 and moves the bars upwardly, the drive plates and disks shifting into driving position under the pressure of springs 85.

The outer face of each disk is provided with concentric rows of teeth 88, any one row of which may mesh with the teeth 89 of a pinion 90. The purpose of the several rows of disk teeth is to furnish a multiplicity of speeds for driving the seed feeding wheels, their speed of rotation varying as the pinion is shifted from one row of teeth to another.

The pinion 90 is shiftably mounted upon and drives the vertically positioned square shaft 99 the lower end of which is supported by a button bushing 100 seated in the boxing 23. The shaft 99 is a part of the driving connections through which the seed delivering devices are actuated, but as such mechanism is not claimed in this application it will not be further described herein.

What I claim is—

1. In a seeding machine, the combination with a frame comprising a substantially U-shaped member disposed approximately horizontally, and a non-rotatable transverse member back of the central portion thereof and having its end portions connected therewith, of rotatable wheel-carrying members mounted on the end portions of said U-shaped member and having their inner end portions supported by the end portions of said transverse member.

2. In a seeding machine, the combination with a frame comprising a substantially U-shaped member disposed approximately horizontally, a non-rotatable transverse member back of the central portion thereof and having its end portions connected therewith, and means connecting the intermediate portion of said transverse member with the intermediate portion of said U-shaped member, of rotatable wheel-carrying members mounted on the end portions of said U-shaped member and having their inner end portions supported by the end portions of said transverse member.

3. In a seeding machine, the combination with a frame comprising a substantially U-shaped member disposed approximately horizontally, a non-rotatable transverse member back of the central portion thereof, and boxings non-rotatably connected with the end portions of said transverse member and with intermediate portions of said U-shaped member, of rotatable wheel-carrying members mounted on the end portions of said U-shaped member and having their inner end portions supported by said boxings.

4. In a seeding machine, the combination with a frame comprising a substantially U-shaped member disposed approximately horizontally, a transverse member back of the central portion thereof, means connecting the intermediate portion of said transverse member with said U-shaped member, boxings non-rotatably secured to the end portions of said transverse member, and means connecting said boxings with the intermediate portions of said U-shaped member, of rotatable wheel-carrying members mounted on the end portions of said U-shaped member and having their inner end portions supported by boxings.

5. In a seeding machine, the combination with a frame comprising a substantially U-shaped member disposed approximately horizontally, a non-rotatable transverse member back of the central portion thereof, and boxings connected with intermediate portions of said U-shaped member and with the end portions of said transverse member, of sleeves rotatably mounted on the end portions of said U-shaped member, wheels mounted on said sleeves and rotating therewith, and axles extending through said sleeves and mounted in said boxings.

6. In a seeding machine, the combination with a frame comprising a substantially U-shaped member disposed approximately horizontally, a non-rotatable transverse member back of the central portion thereof, and boxings connected with intermediate portions of said U-shaped member and with the end portions of said transverse member, of sleeves rotatably mounted on the end portions of said U-shaped member, wheels mounted on said sleeves and rotating therewith, and axles extending through said sleeve and mounted in said boxings, said axles being connected to rotate with said sleeves.

7. In a seeding machine, the combination with a frame comprising a substantially U-shaped member disposed approximately horizontally, boxings carried by the end portions of said U-shaped member, a non-rotatable transverse member back of the central portion of said U-shaped member, and boxings connected with the end portions of said transverse member and with intermediate portions of said U-shaped member, of sleeves rotatably mounted in the boxings carried by the end portions of said U-shaped member, wheels mounted on said sleeves, and axles extending through said sleeves and mounted in the boxings at the end portions of said transverse member.

8. In a seeding machine, the combination with a frame comprising a substantially U-shaped member disposed approximately horizontally, a transverse member back of the central portion thereof, boxings mounted on the end portions of said transverse member, and means connecting said boxings with intermediate portions of said U-shaped member, of live axles mounted on the end portions of said U-shaped member and having their inner end portions supported by the boxings at the end portions of said transverse member, said axles being inclined downward toward their outer ends, and wheels mounted upon said wheel carrying members.

9. In a seeding machine, the combination with a frame comprising a substantially U-shaped member disposed approximately horizontally, a non-rotatable transverse member back of the central portion thereof, boxings mounted on the end portions of said transverse member, means connecting said boxings with intermediate portions of said U-shaped member, and boxings carried by the end portions of said U-shaped member, of axles mounted in the latter boxings and having their inner ends mounted in the boxings at the end portions of said transverse member, said axles being inclined downward toward their outer ends, sleeves mounted upon said axles and journaled in the boxings at the end portions of said U-shaped member, and wheels mounted on said sleeves.

10. In a seeding machine, the combination with a frame comprising a substantially U-shaped member disposed approximately horizontally, a non-rotatable transverse member back of the central portion thereof, boxings secured to the end portions of said transverse member, and means connecting said boxings with intermediate portions of said U-shaped member, of axles rotatably supported by the end portions of said U-shaped member, the inner end portions of said axles being journaled in said boxings, and wheels carried by said axles and rotating therewith.

11. In a seeding machine, the combination with a frame comprising a substantially U-shaped member disposed approximately horizontally, a non-rotatable transverse member back of the central portion thereof, boxings secured to the end portions of said transverse member, and means connecting said boxings with intermediate portions of said U-shaped member, of axles rotatably supported by the end portions of said U-shaped member, the inner end portions of said axles being journaled in said boxings, wheels carried by said axles and rotating therewith, and thrust bearing discs in said boxings between the adjoining ends of said transverse member and said axles.

12. In a seeding machine, the combination with a frame comprising a substantially U-shaped member disposed approximately horizontally, a non-rotatable transverse member back of the central portion thereof, boxings secured to the end portions of said transverse member, and means connecting said boxings with intermediate portions of said U-shaped member, of axles rotatably supported by the end portions of said U-shaped member, the inner end portions of said axles being journaled in said boxings, wheels carried by said axles and rotating therewith, collars mounted on said axles, and caps mounted on the outer end portions of said boxings and embracing said collars.

13. In a seeding machine, the combination with a frame comprising a substantially U-shaped member disposed approximately horizontally, a non-rotatable transverse member back of the central portion thereof, boxings secured to the end portions of said transverse member, and means connecting said boxings with intermediate portions of said U-shaped member, of axles rotatably supported by the end portions of said U-shaped member, said axles being inclined downward toward their outer ends, the inner end portions of said axles being journaled in said boxings, wheels carried by said axles and rotating therewith, and thrust bearing discs in said boxings between the adjoining ends of said transverse member and said axles.

14. In a seeding machine the combination with a frame comprising a substantially U-shaped member disposed approximately horizontally, a non-rotatable transverse member back of the central portion thereof, boxings connected with the end portions of said transverse member, and means connecting said boxings with intermediate portions of said U-shaped member, of sleeves rotatably supported by the end portions of said U-shaped member, wheels mounted on said sleeves, axles extending through said sleeves and journaled in said boxings, and driving members slidably mounted on said axles and connected to rotate therewith.

15. In a seeding machine, the combination with a frame comprising a substantially U-shaped member disposed approximately horizontally, a non-rotatable transverse member back of the central portion thereof, boxings connected with the end portions of said transverse member, and means connecting said boxings with intermediate portions of said U-shaped member, of sleeves rotatably supported by the end portions of said U-shaped member, wheels mounted on said sleeves, axles extending through said sleeves and journaled in said boxings, driving members slidably mounted on said axles and extending over the inner end portions of said sleeves, and means connecting said driving members with said sleeves so that they rotate in unison.

16. In a seeding machine, the combination with a frame comprising a substantially U-shaped member disposed approximately horizontally, a non-rotatable transverse member back of the central portion thereof, boxings connected with the end portions of said transverse member, and means connecting said boxings with intermediate portions of said U-shaped member, of axles supported by the end portions of said U-shaped member and having their inner ends journaled in said boxings, wheels mounted to rotate with said axles, driving plates mounted on said axles to move endwise thereof while rotating therewith, gears associated with said driving plates, and ratchet mechanism operating to connect said driving plates with said gears.

17. In a seeding machine, the combination with a frame comprising a substantially U-shaped member disposed approximately horizontally, a non-rotatable transverse member back of the central portion thereof, boxings connected with the end portions of said transverse member, and means connecting said boxings with intermediate portions of said U-shaped member, of sleeves rotatably supported by the end portions of said U-shaped member, wheels mounted on said sleeves, axles extending through said sleeves and journaled in said boxings, driving plates slidably mounted on said axles and connected to rotate therewith, driving gears associated with said driving plates, and ratchet mechanism operatively connecting said driving plates with said gears.

18. In a seeding machine, the combination with a frame comprising a substantially U-shaped member disposed approximately horizontally, a non-rotatable transverse member back of the central portion thereof, boxings connected with the end portions of said transverse member, and means connecting said boxings with intermediate portions of said U-shaped member, of sleeves rotatably supported by the end portions of said U-shaped member, wheels mounted on said sleeves, axles extending through said sleeves and journaled in said boxings, driving plates slidably mounted on said axles and extending over the inner end portions of said sleeves, means connecting said driving plates with said sleeves so that they rotate in unison, driving gears associated with said driving plates, and ratchet mechanism operatively connecting said driving plates with said gears.

19. In a seeding machine, the combination with live axles and wheels mounted thereon and turning therewith, of a frame comprising boxings in which the outer end portions of said axles are journaled, boxings in which the inner end portions of said axles are journaled, a transverse member connecting the latter boxings together, and a frame member connected with all of said boxings.

20. In a seeding machine, the combination with live axles and wheels mounted thereon and turning therewith, of a frame comprising boxings in which the outer end portions of said axles are journaled, boxings in which the inner end portions of said axles are journaled, a transverse member connecting the latter boxings together, and a frame member disposed in advance of said transverse member and having rearwardly extending members connected respectively with said boxings.

21. In a seeding machine, the combination with a frame member having rearwardly extending intermediate and end arms, boxings carried by the rear end portions of said arms, and a member connecting the intermediate boxings together, of axles journaled in said boxings, and wheels mounted on said axles.

22. In a seeding machine, the combination with live axles and wheels mounted thereon and turning therewith, of a non-rotatable transverse member interposed between and connected with the inner end portions of said live axles, means rotatably supporting the outer end portions of said live axles, and means rotatably supporting the inner end portions thereof.

23. In a seeding machine, the combination with live axles inclined downwardly toward their outer ends and wheels mounted thereon and turning therewith, of a non-rotatable transverse member interposed between and connected with the inner end portions of said live axles, means rotatably supporting the outer end portions of said live axles, and means rotatably supporting the inner end portions thereof.

24. In a seeding machine, the combination of live axles and wheels mounted thereon and turning therewith, of a non-rotatable transverse member interposed between and connected with the inner end portions of said live axles, means rotatably supporting the outer end portions of said live axles, and boxings rotatably supporting the inner end portions of said live axles and non-rotatably supporting the end portions of said transverse member.

25. In a seeding machine, the combination with a frame comprising a substantially U-shaped member disposed approximately horizontally, a non-rotatable transverse member back of the central portion thereof and having its end portions connected therewith, a longitudinally extending frame member connecting the central portion of said transverse member with the central portion of said U-shaped member, a tongue pivotally supported by said longitudinally-extending frame member, and a lever pivotally mounted upon the tongue and connected with said U-shaped member for adjusting the angular position thereof with reference to the tongue, of rotatable wheel carrying members mounted on the end portions of said U-shaped member and having their inner end portions connected with the end portions of said transverse member.

26. In a seeding machine, the combination of a frame, inclined rotatable axles supported by the ends of the frame, a horizontally positioned non-rotating axle member supported by the frame intermediate the ends of the inclined axles, ground wheels on the inclined axles, furrow openers pivotally connected with the frame, and a lever mounted on the non-rotating axle member and connected with the furrow openers for raising and lowering the furrow openers.

WILLARD A. VAN BRUNT.